July 24, 1928.

F. W. A. HALLERMAN

BAIL HANDLE

Filed June 12, 1925

1,678,005

Inventor:
Frank W. A. Hallerman,
by John N Brunnga
Attorney

Patented July 24, 1928.

1,678,005

UNITED STATES PATENT OFFICE.

FRANK W. A. HALLERMAN, OF ST. LOUIS, MISSOURI.

BAIL HANDLE.

Application filed June 12, 1925. Serial No. 36,570.

This invention pertains to handles and more particularly to a handle which may be applied to a bail so as to render the same easier to carry.

One of the objects of this invention is to provide a detachable handle which may be applied to a wire bail so as to protect the hand in carrying the same.

Another object is to provide such a detachable handle which when applied to the bail will be retained in place thereon.

Another object is to provide such a handle which may be applied to bails of different sizes and shapes.

Further objects will appear from the following description taken in connection with the accompanying drawing in which.

Figure 1:
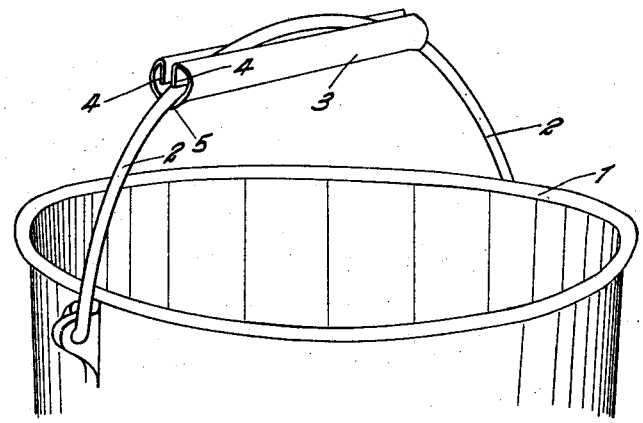
Figure 1 is a perspective view showing a pail having a handle embodying this invention applied to the bail thereof.
Figure 2:
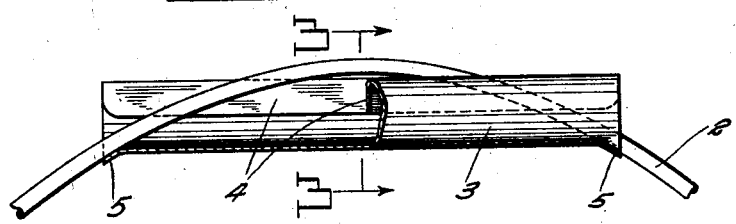
Figure 2 is a side view partly in section showing the bail with the handle applied thereto.
Figure 3:
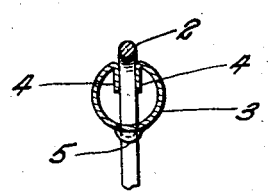
Figure 3 is a section on line 3—3 of Figure 2.

Referring to the accompanying drawing 1 designates a pail or other receptacle having the usual wire bail 2. 3 designates a carrying handle embodying the present invention. This may be made up of a sheet, usually of metal or material having similar properties, sheet fibre being sometimes used. The sheet or strip of material is curled so as to form a handle of generally cylindrical shape as illustrated in the drawing. If desired this handle may be formed with the usual bulge at its middle portion or other common or usual shape for handles. The edges of the sheet may be turned inwardly to form flanges 4, extending inwardly from the surface of the handle and leaving a recess therebetween into which the bail 2 may be slipped. At the ends of the handle, notches 5 may be pressed into the sheet to receive the bail and assist in centering the same. These notches also provide bearings for the bail 2 spaced apart at the ends of the handle.

The handle is preferably formed of a material which is pliable, at least to some extent, and resilient. On account of the resiliency the flanges 4 will close upon the bail therebetween so as to clamp the bail to retain the handle in place thereon. It will be seen, that on account of such resiliency the handle may be applied to bails of different thicknesses, the edges of the cylinder springing apart to admit the bail and clamping the same therebetween. While the flanges 4 may be omitted and the handle still retain its usefulness, these flanges serve to broaden the bearing surface clamping the bail so that the handle may be applied to bails of a wide range of sizes or shapes. As the material of the strip is pliable a handle which has been used on a thick bail and which may consequently have become permanently sprung apart can be pressed together so as to be usable upon a thinner bail.

It will be seen, therefore, that this invention provides a simple bail handle which is cheap to manufacture and which is easily and quickly applied to a bail of any thickness or curvature. When so applied it not only protects the hand against the cutting action of the bail but will remain in place when released by the hand.

It is obvious that various changes may be made in the details of construction without departing from the spirit of this invention; it is to be understood, therefore, that this invention is not to be limited to the specific details shown and described.

Having thus described the invention what is claimed is:

1. A bail handle, comprising, a resilient strip curled to provide a handle and having a recess therealong to receive the bail, and having a pair of inturned flanges along said recess, adapted to clamp the bail between said flanges.

2. A bail handle, comprising, a strip curled to form a pliable hollow cylindrical handle having a recess therealong to receive the bail, inturned flanges along said recess adapted to clamp the bail, and a bail-receiving notch in the lower end portion of said handle.

In testimony whereof I affix my signature this 1st day of June, 1925.

FRANK W. A. HALLERMAN.